United States Patent
Ryu et al.

(10) Patent No.: US 7,106,260 B2
(45) Date of Patent: Sep. 12, 2006

(54) ANTENNA DEVICE FOR PORTABLE WIRELESS TERMINAL

(75) Inventors: Wan-Sang Ryu, Suwon-si (KR); Jang-Hyun Nam, Suwon-si (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 10/969,732

(22) Filed: Oct. 20, 2004

(65) Prior Publication Data
US 2005/0179602 A1 Aug. 18, 2005

(30) Foreign Application Priority Data
Feb. 17, 2004 (KR) ............ 10-2004-0010382

(51) Int. Cl.
*H01Q 1/24* (2006.01)
(52) U.S. Cl. .............. 343/702; 343/575.4
(58) Field of Classification Search ........ 343/702, 343/725; 455/575.4, 90.1, 90.3
See application file for complete search history.

(56) References Cited

U.S. PATENT DOCUMENTS

| | | | |
|---|---|---|---|
| 5,905,467 A * | 5/1999 | Narayanaswamy et al. | 343/702 |
| 5,978,655 A * | 11/1999 | Ohura et al. | 455/41.1 |
| 6,225,951 B1 * | 5/2001 | Holshouser et al. | 343/700 MS |
| 6,463,262 B1 * | 10/2002 | Johnson et al. | 455/90.1 |
| 6,785,565 B1 * | 8/2004 | Gventer | 455/575.4 |
| 6,961,593 B1 * | 11/2005 | Lonka et al. | 455/573 |
| 6,980,840 B1 * | 12/2005 | Kim et al. | 455/575.4 |

* cited by examiner

*Primary Examiner*—Hoang V. Nguyen
(74) *Attorney, Agent, or Firm*—Dilworth & Barrese LLP

(57) ABSTRACT

Disclosed herein is an antenna device for use with a portable wireless terminal having a main body, and a sub-body slidably coupled to the main body. The antenna device includes a first antenna mounted in the main body, and a second antenna mounted on the sub-body. The second antenna is selectively exposed to the outside as the sub-body moves on the main body in a sliding manner. In case of a conventional sliding-type terminal, there is a problem in that an antenna device incorporated in its main body is interfered with by body parts of a user, thereby causing deterioration in the performance thereof. However, the antenna device according to the present invention compensates for such a deterioration in performance by using the additional second antenna mounted on the sub-body of the terminal. This improves the transmitting/receiving signal quality of the terminal. Furthermore, as such an antenna device is incorporated inside a sliding-type terminal or a pop-up type terminal, it is possible to eliminate a risk of damage and to diversify the design of the terminal.

4 Claims, 5 Drawing Sheets

ANTENNA DEVICE FOR PORTABLE WIRELESS TERMINAL

PRIORITY

This application claims priority to an application entitled "ANTENNA DEVICE FOR PORTABLE WIRELESS TERMINAL", filed in the Korean Intellectual Property Office on Feb. 17, 2004 and assigned Serial No. 2004-0010382, the contents of which are hereby incorporated by reference.

BACKGROUND OF THE INVENTION

1. Field of the Invention

The present invention relates to portable wireless terminals, and more particularly to an antenna device for use with a portable wireless terminal.

2. Description of the Related Art

Generally, "portable wireless terminals" are mobile communication devices that are portable and enable owners of the devices to wirelessly communicate with partners or mobile communication carriers through base stations. At an initial stage of commercialization, the possible service provided by portable wireless terminals was limited to a simple voice communication service, short message transmitting/receiving service, etc. However, nowadays, the service provided by portable wireless terminals is gradually expanding to include video communication, video clip service, mobile banking, etc. as mobile communication techniques progress.

The portable wireless terminals require an antenna device in order to perform wireless communication with partners and base stations. Moreover, as mobile communication service expands to include multimedia service such as video clip service, performance of the antenna device has become an important measure to determine signal quality of the portable wireless terminals.

FIG. 1 is a perspective view illustrating a conventional portable wireless terminal 100 having an integrated, protruding antenna device 103. FIG. 2 is a perspective view illustrating a sub-body 102 of the portable wireless terminal 100 shown in FIG. 1 slid open.

As shown in FIGS. 1 and 2, the antenna device 103 of the portable wireless terminal 100 is extended out of, i.e. protrudes from, the terminal 100.

The portable wireless terminal 100 is a sliding-type terminal, and comprises a main body 101, and the sub-body 102 slidably coupled to the main body 101 so as to longitudinally move thereon. The main body 101 is provided, at a lower region of its front surface, with a keypad 111 in a 3×4 array, and a transmitter module 113, and further provided with the antenna device 103 extending upward from an upper end of the main body 101. At a front surface of the sub-body 102 are provided a display unit 121, a receiver module 123, a keypad 125 consisting of functional keys, and a camera unit 129 for use in video communication and video recording.

It will be recognized that the antenna device 103, which is fixedly mounted to the main body 101, may vary in size to accommodate different antenna lengths, as required according to frequency bands used by mobile communication carriers.

Such conventional antenna devices of the type extending out of a portable wireless terminal, however, have various problems such as increased risk of damage due to external shock, can be inconvenient when carrying the terminal, and limit diversification in design of the terminal.

In order to solve the above problems exhibited by protruded antenna devices, antenna devices have been in the interior of portable wireless terminals, and portable wireless terminals having an internal antenna device are gradually being commercialized.

Although the antenna device extending out of the portable wireless terminal has a risk of damage, presents an inconvenience when carrying the terminal, and limits the options for diversifying the design of the terminal, as stated above, conventional antenna devices mounted so as not to extend out of the terminal, i.e. that do not protrude, present other problems such as degraded performance, as well as degraded transmitting/receiving signal quality due to interference with body parts of a user, such as the user's hands, when in a communication mode.

SUMMARY OF THE INVENTION

Therefore, the present invention has been made in view of the above problems, and it is an object of the present invention to provide an antenna device for a portable wireless terminal that can secure good transmitting/receiving signal quality of the terminal.

In accordance with an aspect of the present invention, the above and other objects can be accomplished by the provision of an antenna device for a portable wireless terminal having a main body, and a sub-body slidably coupled to the main body, including a first antenna mounted in the main body; and a second antenna mounted on the sub-body, wherein the second antenna is selectively exposed to the outside as the sub-body moves on the main body in a sliding manner.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted when to avoid making the subject matter of the present invention unclear.

Figure 1:
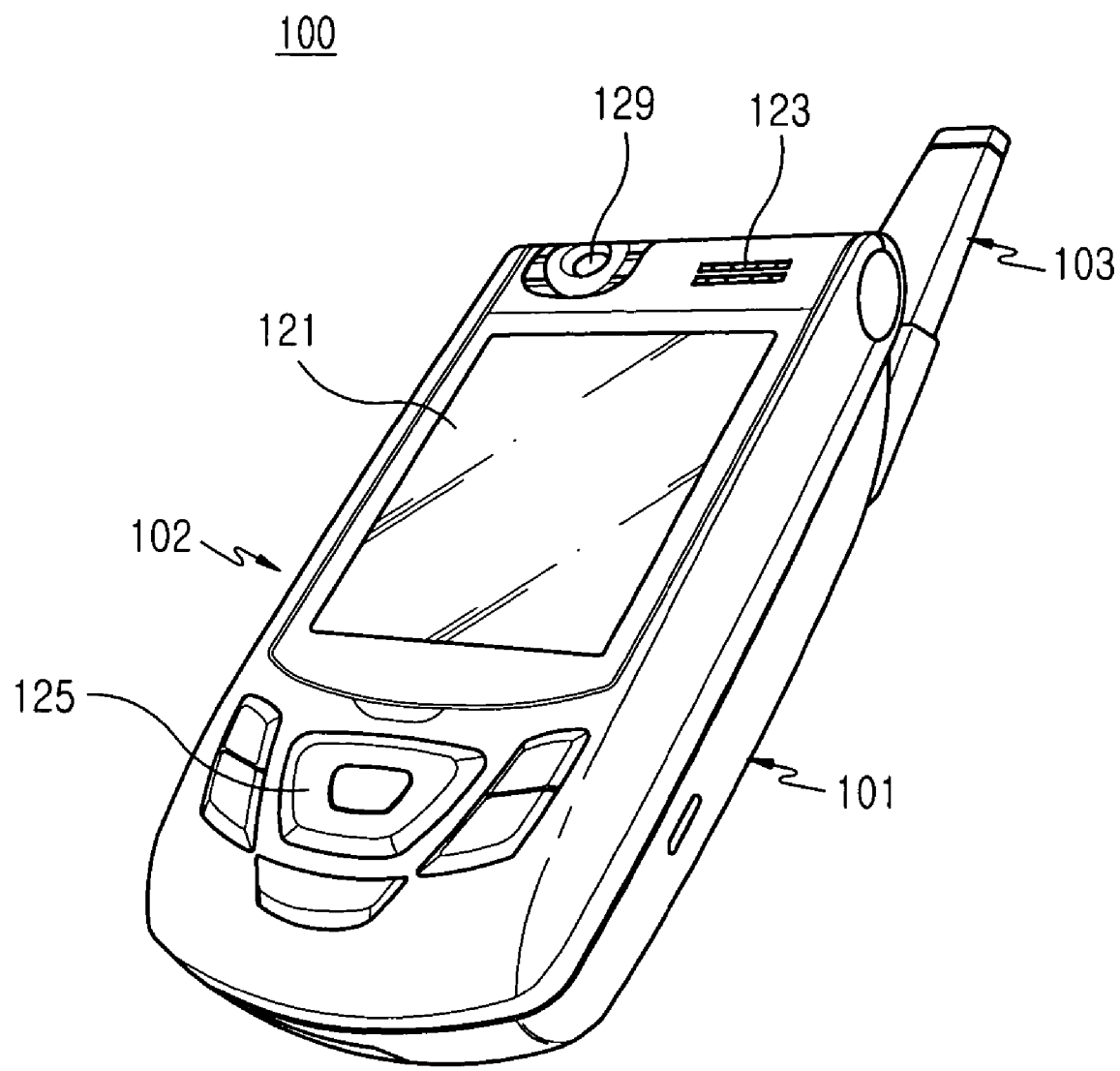
FIG. 1 is a perspective view illustrating a conventional portable wireless terminal having an integrated, protruding antenna device.
Figure 2:
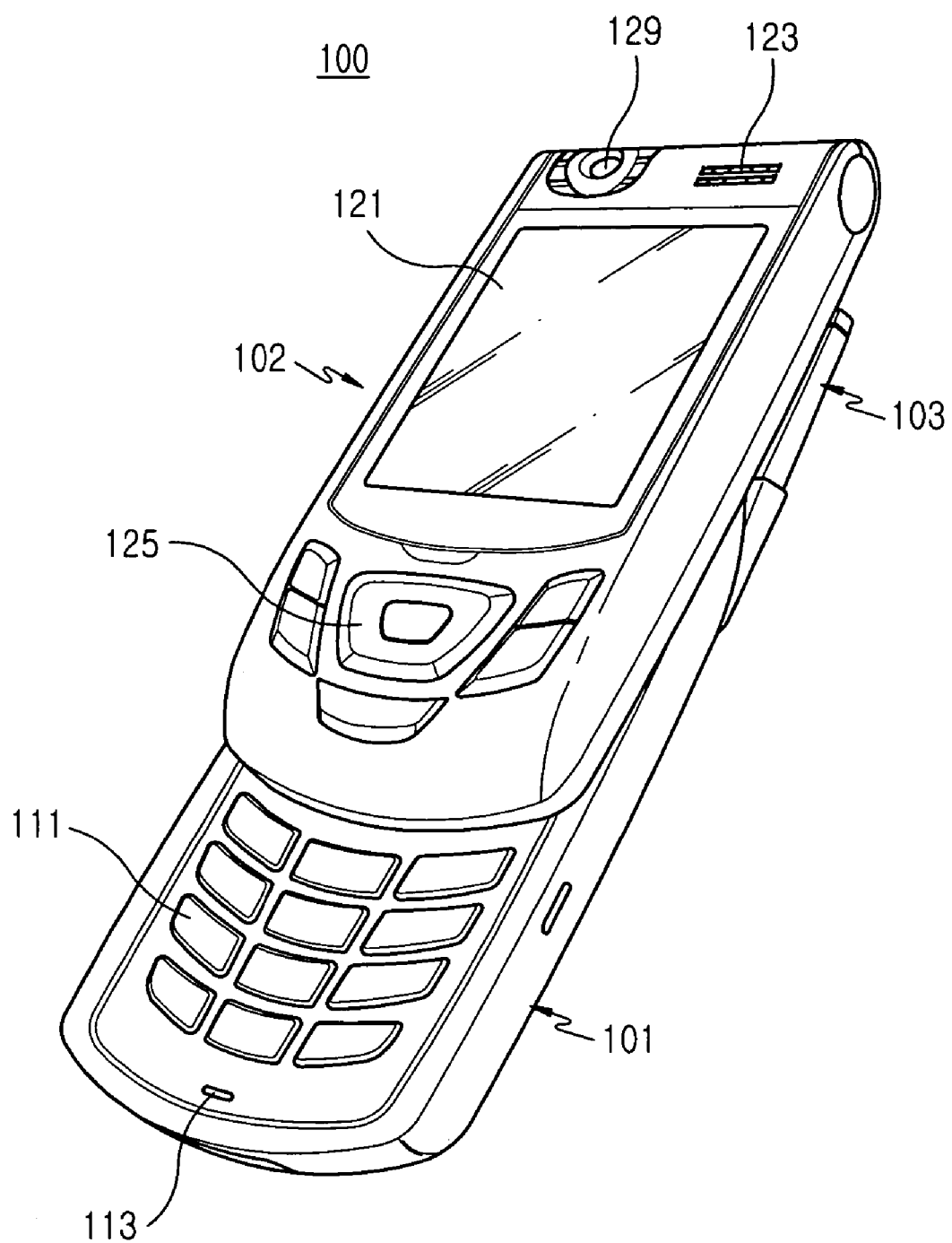
FIG. 2 is a perspective view illustrating a sub-body of the portable wireless terminal shown in FIG. 1 slid-open.
Figure 3:
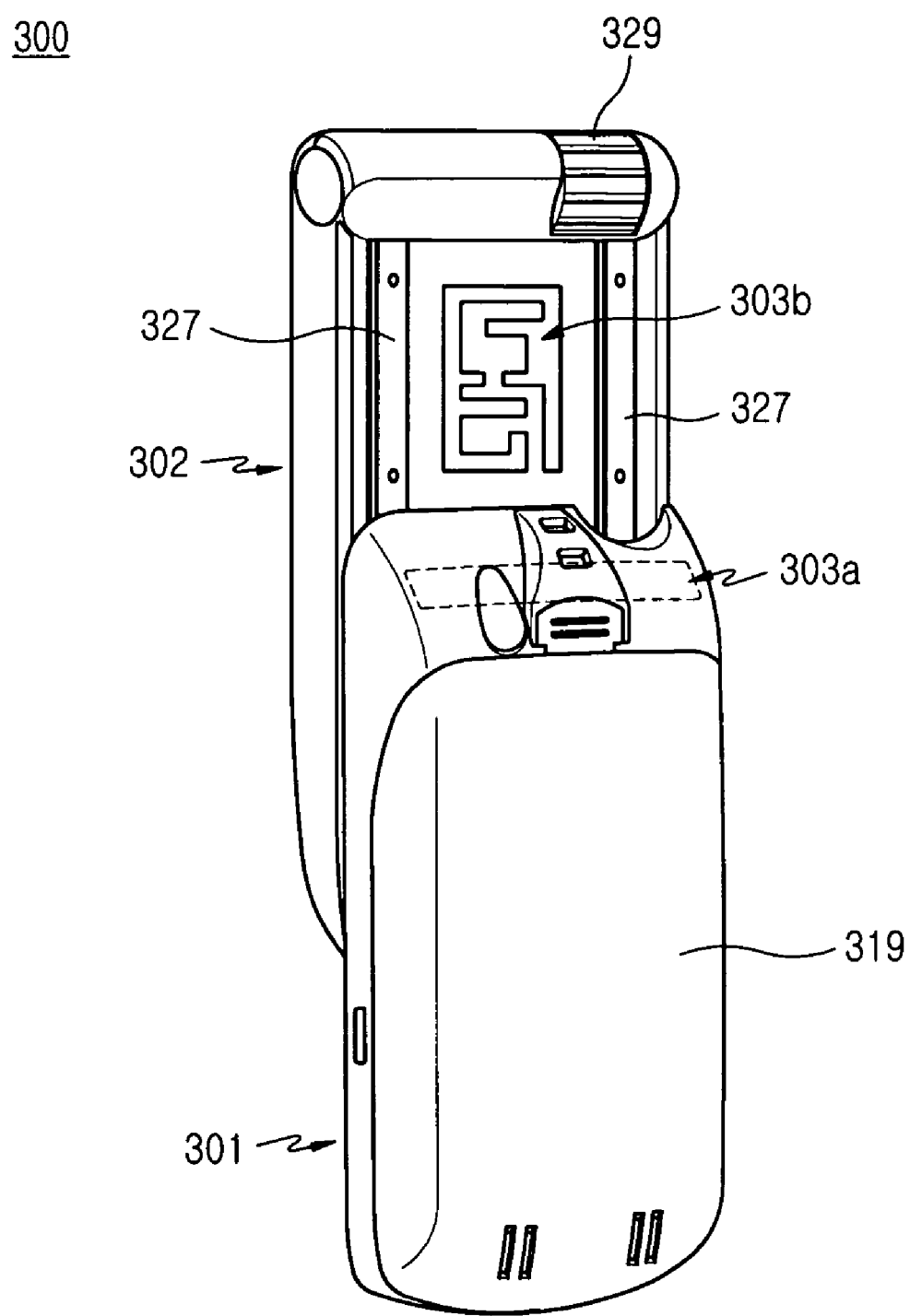
FIG. 3 is a perspective view illustrating a portable wireless terminal having an antenna device in accordance with a first preferred embodiment of the present invention.

FIG. 3 is a perspective view illustrating a portable wireless terminal 300 having an antenna device in accordance with a first preferred embodiment of the present invention. The antenna device comprises a first antenna 303a and a second antenna 303b.

Referring to FIG. 3, the portable wireless terminal 300 is a sliding-type terminal, and comprises a main body 301, and a sub-body 302 slidably coupled to the main body 301 so as to longitudinally move thereon. A battery pack 319 is separably coupled to a rear surface of the main-body 301. The first antenna 303a is incorporated at a position close to an upper end of the main body 301.

The sub-body 302 has a camera unit 329 mounted at an upper end thereof, and, at a rear surface thereof, has a pair of guide rails 327 for guiding the sliding movement thereof, and the second antenna 303b. The second antenna 303b is preferably a planar antenna attached to the rear surface of the sub-body 302. Alternatively, according to the product design, the second antenna 303b is preferably a planar patterned antenna mounted on a plate (not shown) attached to the rear surface of the sub-body 302.

In a state in which the sub-body 302 of the portable wireless terminal 300 configured as described above is slid up so that it is positioned overlapping only the upper portion of the main body 301, the sub-body 302 will partially intercept a radiation pattern of the first antenna 303a, resulting in degradation in performance of the first antenna 303a. The performance of the first antenna 303a is further degraded due to interference of body parts of a user, such as the user's hands. In this case, however, the second antenna 303b is exposed upward, i.e. longitudinally extended in a direction away from the sub-body 302, from the main body 301, and is adapted to compensate for the reduced performance of the first antenna 303a. Therefore, the antenna device of the portable wireless terminal 300 can secure appropriate and improved transmitting/receiving signal quality by virtue of the cooperation of the first and second antennas 303a and 303b.

Figure 4:
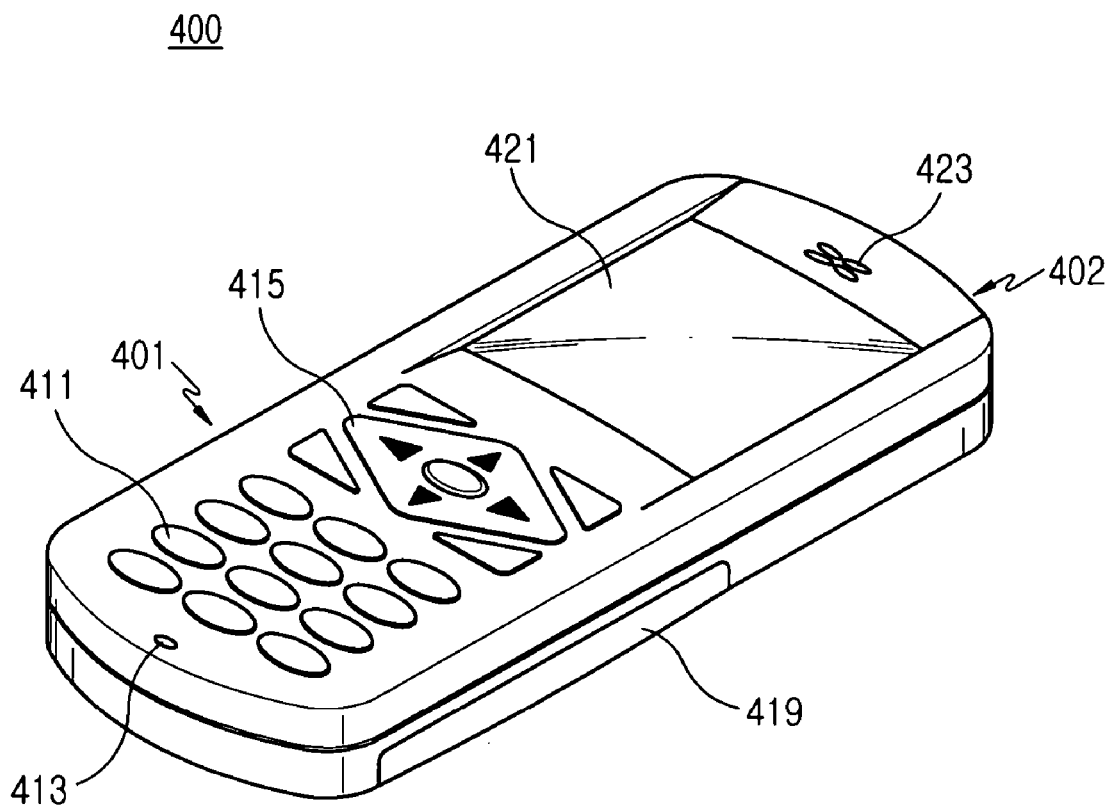
FIG. 4 is a perspective view illustrating a portable wireless terminal having an antenna device in accordance with a second preferred embodiment of the present invention.
Figure 5:
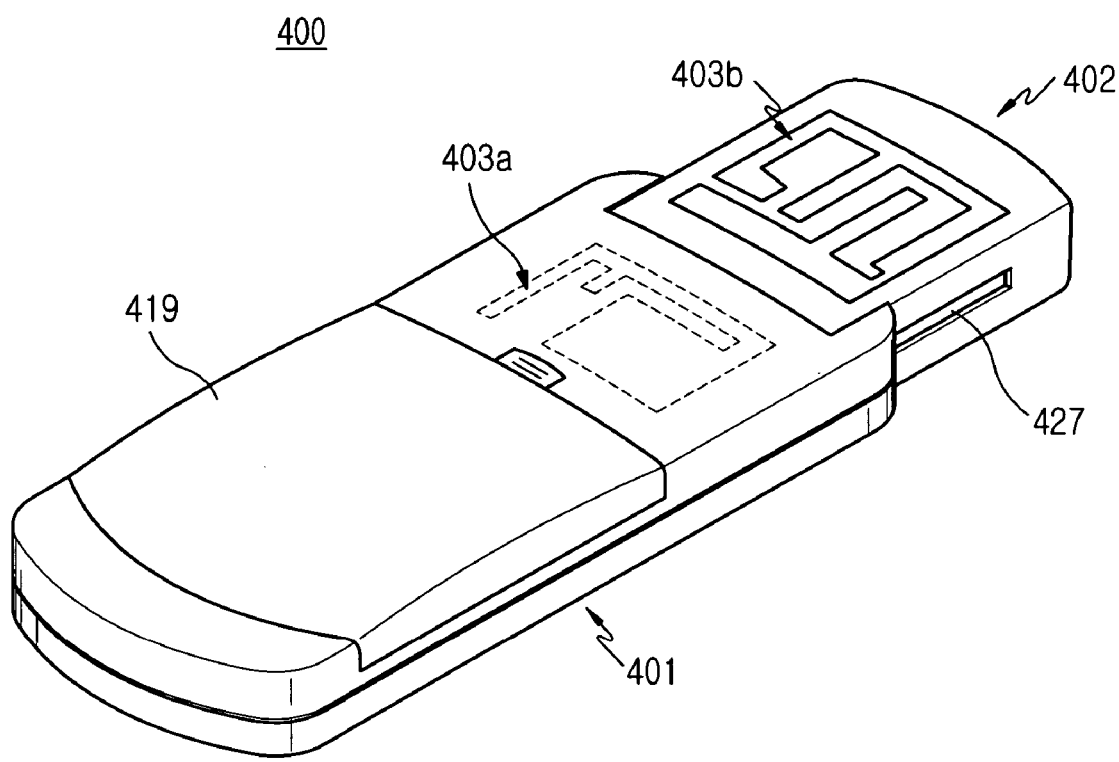
FIG. 5 is a rear perspective view illustrating a sub-body of the portable wireless terminal shown in FIG. 4 in an upwardly moved state.

FIG. 4 is a perspective view illustrating a portable wireless terminal 400 having an antenna device in accordance with a second preferred embodiment of the present invention. FIG. 5 is a rear perspective view illustrating a sub-body 402 of the portable wireless terminal 400 shown in FIG. 4 in an upwardly moved state. In the present embodiment, the antenna device comprises a first antenna 403a and a second antenna 403b.

The portable wireless terminal 400 is a pop-up type terminal, and comprises a main body 401, and a sub-body 402 which is extractable from an upper end of the main body 401.

The main body 401 is provided, at a front surface thereof, with an input keypad 411 in a 3×4 array, a functional keypad 415 including a menu call key and functional keys, and a transmitter module 413. A battery pack 419 is separably coupled to a rear surface of the main body 401. Also incorporated, at a position close to an upper end of the main body 401, is the first antenna 403a.

The sub-body 402 is coupled to the main body 401 so as to be extractable therefrom or retractable thereinto. FIG. 4 is a front perspective view illustrating a retracted state of the sub-body 402 inside the main body 401, and FIG. 5 is a rear perspective view illustrating an extracted, or extended, state with the sub-body 402 moved outside or extended from, the main body 401.

The sub-body 402 is provided at a front surface thereof with a display unit 421 and a receiver module 423, and at a rear surface thereof with the second antenna 403b. In addition, along both lateral surfaces of the sub-body 402 are formed guide grooves 427, respectively. The guide grooves 427 serve to guide the extracting and retracting operations of the sub-body 402 from and into the main body 401.

Meanwhile, in order to enable confirmation of a transmitting/receiving state of signals, remaining battery power, etc. even in an overlapped state wherein the sub-body 402 is retracted into the main body 401, the front surface of the main body 401 is adapted to be partially open to expose a part of the display unit 421 to the outside.

The second antenna 403b is a planar antenna mounted at the rear surface of the sub-body 402. Similar to the previous embodiment, according to the product design, the second antenna 403b may be a planar patterned antenna mounted on a plate (not shown).

The second antenna 403b is concealed when the sub-body 402 is retracted into the main body 401, and is exposed to the outside when the sub-body 402 is extracted upward from the main body 401, thereby operating as an antenna device. In the use of the terminal, for example, in a conversation mode, the user generally grips the main body 401 of the terminal, and this results in degradation in the performance of the first antenna 403a due to interference by body parts of the user, such as by the user's hands. However, the reduced performance of the first antenna 403a can be compensated by the operation of the second antenna 403b.

As apparent from the above description, the present invention provides an antenna device for a portable wireless terminal, which comprises a first antenna incorporated in a main body, and a second antenna incorporated in a sub-body slidable on the main body and adapted to compensate for degraded performance of the first antenna. In case of conventional sliding-type terminals, there is a problem in that a radiation pattern of an antenna device incorporated in its main body is interfered by body parts of a user, thereby causing deterioration in the performance of the antenna device. However, according to the present invention, the second antenna incorporated in the sub-body of the portable wireless terminal can operate to compensate for such a performance deterioration problem, resulting in an improvement in transmitting/receiving signal quality of the terminal. Furthermore, according to the present invention, in case of both a sliding-type terminal and a pop-up type terminal, the antenna device can be incorporated in the terminals, thereby eliminating a risk of damage and enabling diversification in the design of the terminals.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An antenna device for a portable wireless terminal having a main body, and a sub-body slidably coupled to the main body, comprising:
   a first antenna mounted in the main body; and
   a second antenna mounted on the sub-body,
   wherein the first antenna is an internal antenna mounted close to an upper end of the main body and the second antenna is selectively exposed as the sub-body slidingly moves along the main body.

2. An antenna device for a portable wireless terminal having a main body, and a sub-body slidably coupled to the main body, comprising:
   a first antenna mounted in the main body; and
   a second antenna mounted on the sub-body, wherein the second antenna is selectively exposed as the sub-body slidingly moves along the main body and is a planar antenna attached to a rear surface of the sub-body.

3. The antenna device as set forth in claim 2, wherein the second antenna is a planar patterned antenna.

4. An antenna device for a portable wireless terminal having a main body, and a sub-body slidably coupled to the main body, comprising:

a first antenna mounted in the main body; and
a second antenna mounted on the sub-body, wherein the second antenna is selectively exposed as the sub-body slidingly moves along the main body, and further wherein the sub-body is slidably coupled to the main body and moves between an overlapped state on the main body and an upwardly moved state in which the sub-body is positioned overlapping only an upper portion of the main body, and, in said upwardly moved state of the sub-body, the second antenna is exposed to the outside.

* * * * *